Jan. 15, 1957  F. LINNEMAN  2,777,712
BOAT TRAILER WITH BOAT CLAMPING MEANS
Filed Jan. 22, 1951  3 Sheets-Sheet 1
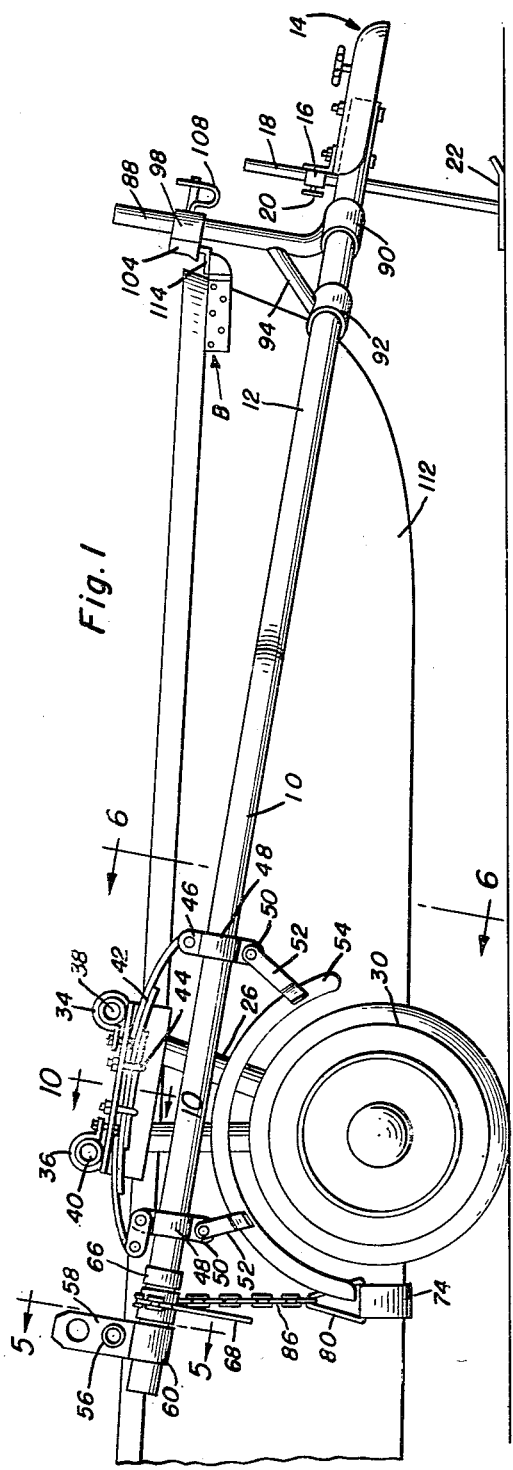
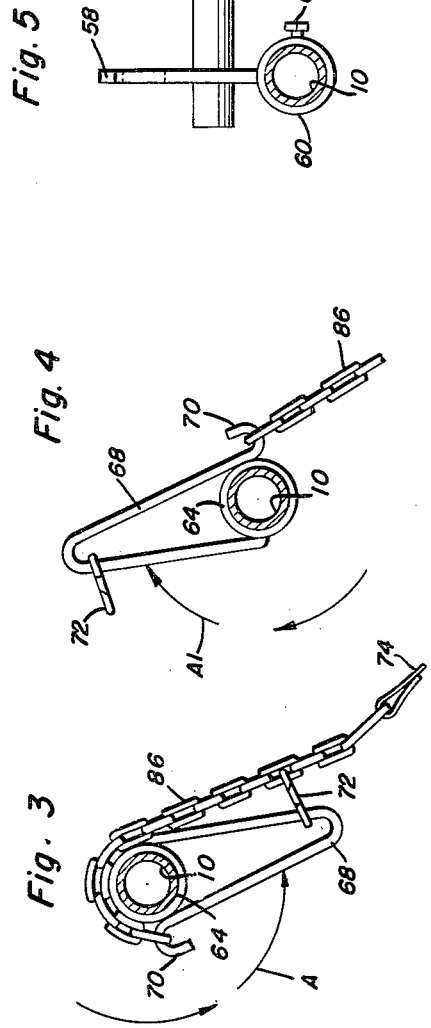
Fred Linneman
INVENTOR.

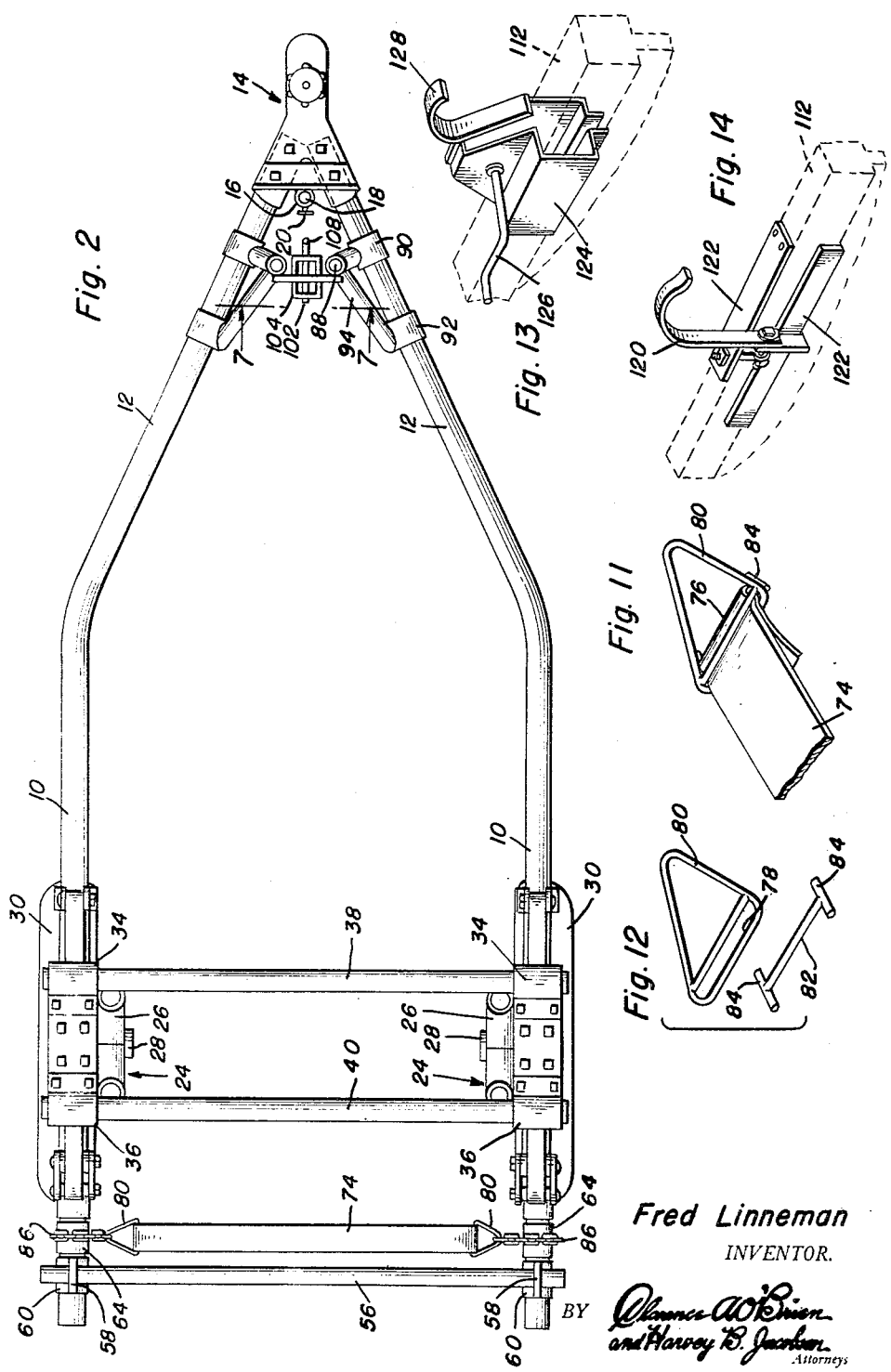

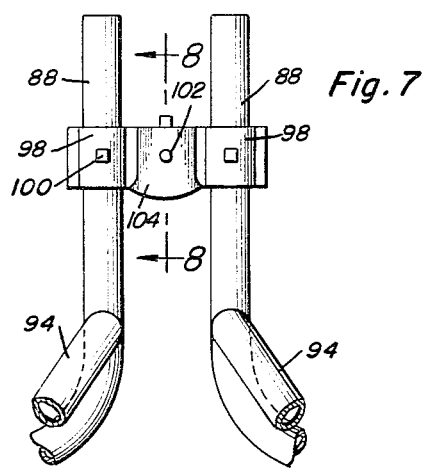
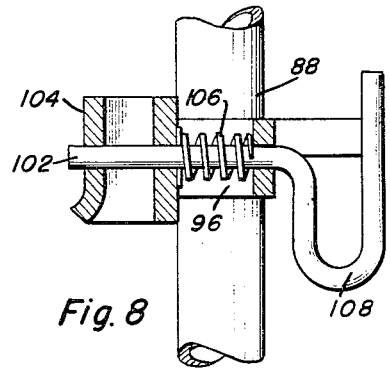
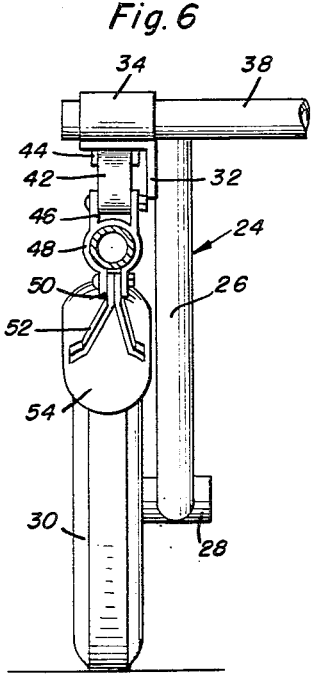
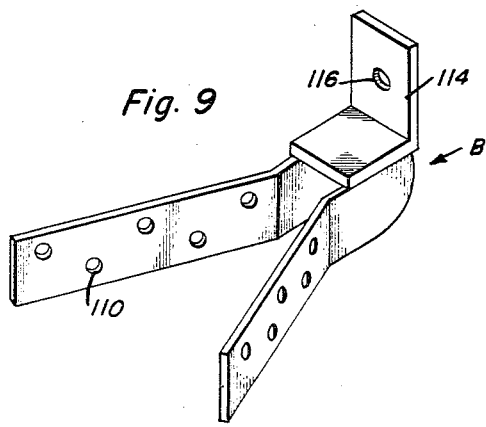
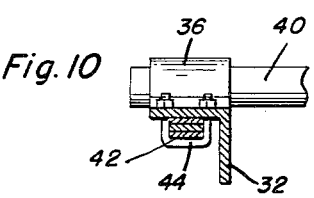
Fred Linneman
INVENTOR.

United States Patent Office 2,777,712
Patented Jan. 15, 1957

2,777,712
BOAT TRAILER WITH BOAT CLAMPING MEANS

Fred Linneman, Estelline, S. Dak.

Application January 22, 1951, Serial No. 207,153

7 Claims. (Cl. 280—414)

This invention relates to new and useful improvements in boat trailers and contains subject matter similar to that disclosed in my copending application Serial No. 11,369, filed February 27, 1948, now Patent 2,564,702.

The primary object of the present invention is to provide a boat trailer including a wheeled frame and embodying novel and improved means for raising, supporting and locking a boat relative to the frame.

Another important object of the present invention is to provide a boat trailer including a pair of side members between which a boat is to be supported and a pair of wheel supports that are quickly and readily adjusted longitudinally on the side members to permit the trailer to be employed with boats of various lengths.

Yet another object of the present invention is to provide a trailer of the aforementioned character including a belly strap extendable beneath a boat positioned between the side members, and sleeves rotatable on the side members and connected to the ends of the strap to effect a raising of the strap and a boat lying thereon as the sleeves are rotated.

A further object of the present invention is to provide a boat trailer including a forward support for the forward end of a boat embodying a vertically adjustable locking mechanism that will engage a bracket mounted on the forward end of a boat to retain the boat in a selected raised position and which will accommodate boats of various depths.

A still further aim of the present invention is to provide a boat trailer that is extremely strong and reliable in use, of tested ability and one that can be produced at a cost beneficial to the purchasing public.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view of the invention supporting a boat;

Figure 2 is a top plan view of the invention;

Figure 3 is an enlarged vertical sectional view through one of the side members to show the strap lifting means locked with the strap raised;

Figure 4 is a view similar to Figure 3 but showing the lifting means unlocked;

Figure 5 is an enlarged detail sectional view taken substantially on the plane of section line 5—5 of Figure 1;

Figure 6 is an enlarged detail sectional view taken substantially on the plane of section line 6—6 of Figure 1;

Figure 7 is an enlarged detail view taken substantially on the plane of section line 7—7 of Figure 2;

Figure 8 is a vertical sectional view taken substantially on the plane of section line 8—8 of Figure 7;

Figure 9 is a perspective view of the boat bracket used in the invention;

Figure 10 is an enlarged detail sectional view taken substantially on the plane of section line 10—10 of Figure 1;

Figure 11 is a perspective view of one end of the lifting and supporting strap used in the invention;

Figure 12 is a group perspective view of the buckle that is mounted on the lifting and supporting strap;

Figure 13 is a perspective view of one type of boat supporting bracket used in the invention; and Figure 14 is a perspective view of another type of boat supporting bracket that may be used in place of the bracket shown in Figure 13.

Referring now to the drawings in detail, wherein for the purpose of illustration, there is disclosed a preferred embodiment of the present invention, the numeral 10 represents a pair of elongated tubular side members having forwardly converging end portions 12 that are joined by a hitch means 14. The hitch means 14 supports a substantially vertical sleeve 16 that slidably receives a prop 18. The prop 18 is held in adjusted position by a set screw 20 carried by the sleeve 16 and the lower end of the prop supports a pressure foot 22.

The side members 10 are movable over the ground through the medium of wheel supports 24. These wheel supports 24 include a pair of V-shaped members 26 whose apices support horizontal stub axles 28 on which wheels 30 are mounted. Angle iron members 32 are secured to the upper ends of the V-shaped members 26 and support forward and rear transverse sleeves 34 and 36. The ends of a forward cross bar 38 are mounted in the forward sleeves 34 and the ends of a rear cross bar 40 are mounted in the rear sleeves 36 and these bars 38 and 40 constitute the connection between the wheel supports.

Elongated spring members or leaf springs 42 overlie the side members 10 and are secured to the undersurfaces of the members 32 by U-bolts 44. The ends of the spring members 42 are pivoted to ears 46 rising from sleeves or clamps 48 that are longitudinally adjustable on the side members 10. The spaced depending ends 50 of the clamps 48 are secured to hanger arms 52 that are secured to wheel shields or fenders 54 which overlie the wheels 30.

A retaining member or cross bar 56 is provided and constitutes an abutment against which a boat will be clamped. The ends of the bar 56 are extended through apertured plates 58 that rise from collars 60. The collars 60 are slidable on the side members 10 and support set screws 62 for longitudinal adjustment of the collars 60 and bar 56 on the side members 10.

Means is provided for raising and supporting a boat and for clamping a boat against the bar 56. This means comprises a pair of sleeves 64 that are rotatably supported on the side members 10 between the collars 60 and stop rings 66 on the side members 10. V-shaped hand grips 68 are fixed to the sleeves 64 and terminate in hooks 70. Clips 72 are slidably mounted on the hand grips 68.

A lifting and supporting strap 74 is connected to the sleeves 64. The ends of the strap 74 are folded upon themselves to provide loops 76 that are extended through openings 78 in attaching rings 80. A bar 82 extends through each loop and includes end pieces 84 that will not pass through the openings 78. Through this buckle construction the length of the belt or strap between the rings 80 may be varied.

The loops or rings 80 are connected to chains 86 and the chains are engaged with the hooks 70, so that as the hand grips 68 are rotated in the direction of arrow A in Figure 3, the chains will be wrapped about the sleeves 64, raising the strap 74 and a boat supported thereon. The clips 72 are then engaged with the chains to lock the strap 74 raised and the sleeves 64 against rotation. When the clips 72 are disengaged with the chains 86 the grips 68 may rotate in the direction of arrow A1 in Figure 4 to effect a lowering of the strap 74 and a boat supported thereon.

A support is mounted on the forward end portions 12 for supporting one end of a boat. This support consists of a pair of upstanding arms 88 having terminal eyes 90 that embrace the end portions 12. Tubes 92 embracing the end portions 12 rearwardly of the eyes 90 are connected to the arms 88 by brace arms 94.

A housing member 96 includes terminal clamps 98 that are slidable on the arms 88 and are held vertically adjusted on the arms 88 by set screws 100. The housing member 96 slidably supports a plunger 102 that is projected through a channel 104, integrally formed with the housing member, by a spring 106. The plunger 102 is provided with a hand grip 108 at its forward end.

Figure 9 shows a boat bracket B that is to be used in conjunction with the support. This bracket is substantially V-shaped and is provided with fastener receiving openings 110 whereby the bracket may be mounted on the forward end of a boat 112.

The apex of the bracket B supports an angle 114 having an aperture 116 that will receive the plunger 102 when the angle is inserted upwardly into the channel 104 and the plunger released from its retracted position.

Means is provided for suspending the boat from the cross bar 56 and this means comprises hook members 120 that are anchored by plates 122 to the sides of the boat. The hook members 120 will engage over the bar 56.

Figure 13 shows the hanger brackets in modified form consisting of slides 124 that support cams (not shown) which are actuated by cranks 126 to adjust the slides 124 on the sides of the boat. The slides 124 support hook members 128 that will engage over the bar 56.

The cross bar 56 functions as a means for leveling a boat that is to be raised out of the water or from the ground so as to permit the cross bar to engage the boat hooks without the necessity of a second individual leveling of the boat manually as is necessarily the case of certain other boat trailers where a prong has to be inserted through a hole in an iron attached to the boat.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A boat trailer comprising a pair of parallel side members having forwardly converging end portions, a pair of wheel supports resiliently attached to said side members and supporting the rear ends of the side members, a cross bar joining said side members, a lifting strap coacting with said cross bar to clampingly support a boat, a pair of chains attached at one of their ends to the ends of said strap, a pair of sleeves rotatable on the side members, hook members carried by the sleeves for engaging selected links of said chains in order to raise the straps upon rotation of said sleeves in one direction, and means carried by said hook members for engaging said chains to lock the strap raised and the sleeves against rotation for clamping a boat between the cross bar and strap.

2. A boat trailer comprising a pair of parallel side members having forwardly converging end portions, a pair of wheel supports, a pair of elongated spring members centrally secured to the supports and overlying the rear portions of the side members, and means at the ends of the spring members slidably adjustably engaging the rear portions of the side members, a cross bar joining said side members, a lifting strap, means rotatably mounted on the side members and connected to the strap for raising the strap in order to clamp a boat between the cross bar and the strap, means for locking the strap raised, and means supported on the forwardly converging end portions of said side members for supporting the forward end of a boat raised above the ground and between the side members, said last means including a pair of arms mounted on said forwardly converging end portions, and a vertically adjustable locking mechanism mounted on said arms and including a spring urged plunger, and a bracket adapted to be mounted on a boat and having an opening for receiving said plunger.

3. A boat trailer comprising a pair of parallel side members having forwardly converging end portions, a pair of wheel supports carried by said side members, a cross bar joining said side members, a lifting strap, means rotatably mounted on the side members and connected to the strap for raising the strap in order to clamp a boat between the cross bar and the strap, means for locking the straps raised, means mounted on said forwardly converging end portions for supporting one end of a boat, a pair of elongated spring members mounted on said supports and overlying said side members, clamps slidably adjustable on said side members and pivoted to the ends of said spring members, said clamps and said spring members constituting the sole means for attaching the supports to the side members, and wheel fenders attached to and depending from said clamps and underlying the side members, said means mounted on the forwardly converging end portions for supporting one end of a boat including a pair of upstanding arms, a housing slidably and adjustably mounted on said arms and a spring urged locking plunger carried by the housing.

4. A boat trailer comprising a pair of side members joined at one of their ends, a pair of wheel supports, means connecting said supports, a pair of elongated spring members carried by said supports, clamps longitudinally adjustable on said side members and connected to the ends of spring members for adjusting the supports longitudinally on said side members, means carried by the side members for raising and supporting a boat and for locking a boat raised between said side members, and means carried by the joined ends of said side members for supporting one end of a boat raised above the ground and between the side members, said means for raising and supporting a boat and for locking a boat raised between said side members includes a strap adapted to underlie a boat, a pair of sleeves rotatably mounted on the side members, chains attached to said sleeves and also attached to the ends of said strap, and slidable clips associated with said sleeves for engaging said chains to lock the sleeves to the chains after the sleeves have been manually rotated sufficiently to raise the strap.

5. The combination of claim 4 and a cross bar terminally secured to said side members and overlying said strap and cooperating with said strap to clamp a boat relative to the side members.

6. A boat trailer comprising a pair of side members, wheel supports for the side members, a cross-bar joining the side members, a lifting strap underlying the crossbar, a pair of sleeves rotatably supported on the side members, hand grips fixed to the sleeves and including hooks, chains engaging the ends of the strap and the hooks, and means slidably received on the hand grips for engaging selected links of the chain to hold the sleeves rotated with the strap raised.

7. In a boat trailer, a pair of side supports each of which comprises a V-shaped frame member, wheels supported at the apices of said frame members, angle iron bars joining the upper ends of said frame members and having horizontal flanges, a pair of elongated upwardly bowed leaf springs having central portions secured against the undersurfaces of said horizontal flanges, clamps at the ends of said springs, and a pair of parallel cross bars terminally secured to the horizontal flanges.

References Cited in the file of this patent

UNITED STATES PATENTS

| | | |
|---|---|---|
| 2,117,401 | Cobb | May 17, 1938 |
| 2,448,443 | Krake | Aug. 31, 1948 |
| 2,494,110 | Stiller | Jan. 10, 1950 |
| 2,498,014 | Spencer et al. | Feb. 21, 1950 |
| 2,516,574 | Holly | July 25, 1950 |
| 2,530,857 | Campbell | Nov. 21, 1950 |
| 2,536,563 | Montgomery | Jan. 2, 1951 |